United States Patent [19]

Smith et al.

[11] 3,859,468

[45] Jan. 7, 1975

[54] REDUNDANT DATA TRANSMISSION ARRANGEMENT

[75] Inventors: Nicholas Kimbrough Smith, Naperville; James Bartel Truesdale, Lombard, both of Ill.

[73] Assignee: Bell Telephone Laboratories Incorporated, Murray Hill, N.J.

[22] Filed: July 25, 1973

[21] Appl. No.: 382,476

[52] U.S. Cl. .......................... 179/15 AL, 179/15 BF
[51] Int. Cl. .............................................. H04j 3/14
[58] Field of Search ...... 179/15 AL, 15 BF; 333/17; 340/146.1 BE; 307/92, 219

[56] References Cited

UNITED STATES PATENTS 3,519,750 7/1970 Beresin .......................... 179/15 AL
3,519,935 7/1970 Hochgraf ........................ 179/15 AL

*Primary Examiner*—David L. Stewart
*Attorney, Agent, or Firm*—J. C. Albrecht

[57] ABSTRACT

A loop data transmission arrangement is disclosed in which a plurality of transmission terminals are serially connected to a base terminal by a primary transmission line and a secondary transmission line over which time-divided data signals are transmitted in opposite directions by the base terminal. Each transmission terminal and the base terminal are equipped with individual fault detectors to monitor signal reception on both the primary and secondary lines. The transmission terminals contain storage devices for storing signals from the fault detectors. In addition, the transmission terminals contain circuitry responsive to the signal outputs of the fault detectors and the signals stored in the storage devices for controlling transmission of signals on the primary and secondary lines. The base terminal contains circuitry for responding to the detection of a fault on one of the lines by terminating data signal transmission on the other line. The base terminal is also capable of stopping data transmission on both lines. The cooperative operation of the transmission terminals and the base terminal when a transmission fault occurs results in the isolation of the fault and the restoration of communication by selectively effecting connections between the primary and secondary lines.

11 Claims, 15 Drawing Figures

Patented Jan. 7, 1975

3,859,468

13 Sheets-Sheet 10

REDUNDANT DATA TRANSMISSION ARRANGEMENT

BACKGROUND OF THE INVENTION

1. Field of the Invention

This invention relates to data transmission arrangements and more specifically to loop data transmission arrangements having redundant transmission facilities for automatic restoration of communications upon the occurrence of a transmission fault.

2. Summary of the Prior Art

Data transmission systems comprising a plurality of transmission terminals and organized in loop arrangements often employ redundant transmission facilities together with circuitry for recognizing the existence of a faulty transmission path and control circuitry to maintain or restore normal data communication upon the occurrence of a transmission fault. In some systems pilot tones are generated at each transmission terminal and detected at the next transmission terminal. Each transmission terminal is equipped with control circuitry which operates in conjunction with the control circuitry of the other transmission terminals when a transmission fault is detected to localize the faulty transmission facility, isolate it, and restore communications over the redundant transmission facilities. While such systems function adequately, they require substantial apparatus in the form of tone detectors and tone generators at each terminal of the transmission loop. As a result, for many applications, such use of pilot tones is precluded by its expense.

Some transmission systems, such as disclosed in McNeilly et al., U.S. Pat. No. 3,652,798, issued Mar. 28, 1972, monitor the transmitted data signals to detect the occurrence of a transmission fault. More specifically, when data signals, which by design are expected at a transmission terminal, are not received, control circuits at that terminal transmit alarm signals over the data transmission loop to the next transmission terminal to effect isolation of the faulty transmission facility and reestablishment of communications using the redundant transmission facilities. When, in the prior art, the state is reached in which the faulty transmission facility is isolated, repair of that facility will not alone restore the system to its normal configuration. More specifically, following the correction of a transmission fault, each of the affected transmission terminals on the transmission loop must be reset to the normal state either manually or by means of a special signal transmitted from a central control terminal. While in many cases this type of operation is satisfactory, there are applications in which it would be preferable to be able to restore all transmission terminals to normal operations from one location without requiring special reset signal detectors at each terminal to detect reset signals.

SUMMARY OF THE INVENTION

A data loop transmission arrangement is provided comprising a plurality of transmission terminals connected serially together by independent primary and secondary transmission lines over which time-divided data signals are transmitted in opposite directions from a base terminal to the transmission terminals and from the transmission terminals to the base terminal. The base terminal contains individual fault detectors to monitor signal reception from the primary transmission line and the secondary transmission line. When a fault detector in the base terminal detects the loss of signal reception on the line it monitors, it inhibits data signal transmission on the other line. In addition, a base terminal is capable of terminating signal transmission on both lines on command.

In accordance with one aspect of the invention, each transmission terminal contains a plurality of signal detectors and a plurality of memory devices for storing the output signals of its respective fault detectors. These memory devices in the transmission terminals comprise a portion of sequential control circuitry which responds to the signals from the fault detectors of the respective transmission terminals for controlling signal transmission from the respective transmission terminals on the primary and secondary transmission lines.

When a fault occurs, the cooperative operation of the transmission terminals and the base terminal effects selective interconnection of the primary and secondary lines to route communications around the faulty facility. In addition, after a faulty transmission facility is repaired, the transmission terminals cooperatively operate to return the repaired facility to use in the transmission arrangement in response to a momentary cessation of transmission of data signals from the base terminal.

A description in functional terms of the cooperative interaction of the base terminal and the transmission terminals both in response to an indication of a fault and in recovery to a fault-free condition may be of assistance in understanding the following description of an embodiment of this invention. As indicated earlier herein, the base terminal and the transmission terminals are connected serially in primary and secondary transmission lines which serve to transmit data signals between terminals in opposite directions. In the absence of indicated fault, data signals are received at each transmission terminal and at the base terminal on both the primary and the secondary transmission lines. It is significant to note in the following discussion that there are no independent control paths interconnecting the transmission terminals and the base terminal and that the reconfiguration of the system from a fault-free condition to a temporary condition to overcome a fault and the return to the fault-free condition is effected by the interruption of signal transmission on the primary and secondary transmission lines.

When the system is operated in the absence of a fault, the failure of a transmission terminal or the base terminal to receive data signals on either the primary or the secondary transmission channel is taken to indicate a fault. The base terminal reacts to an indication of a fault on one of the two lines by terminating its data signal transmission on the other line. As a result, transmission terminals which experience loss of signal reception on one of the lines ultimately experience loss of signal reception on the other line as well. These transmission terminals respond to the first loss of signal reception by affecting data connections, in the nature of a loop back, between the primary and secondary lines. Subsequently, when the signal transmission on the other line is interrupted by the base terminal, each of these terminals transmits a signal on the newly looped facilities to the base terminal. This signal restores the base terminal to normal signal transmission and also restores the transmission terminals on the newly formed data loop, except the terminal directly connected to the faulty transmission facility, to the fault-free configuration. In a similar fashion, the transmission facilities connecting the transmission terminals not included in the newly formed data loop are also looped back to form a data transmission loop to serve those terminals.

When the faulty transmission facilities are repaired, the data transmission arrangement of applicants' invention is restored to its fault-free configuration by terminating data transmission from the base terminal on both transmission lines. At least one of the two terminals which are directly connected to the previously faulted facility transmits a signal to the other of the two terminals over the appropriate line. This signal together with the subsequent restoration of signal transmission by the base terminal returns the arrangement to its fault-free configuration.

DESCRIPTION OF THE ILLUSTRATIVE EMBODIMENT

Figure 1:
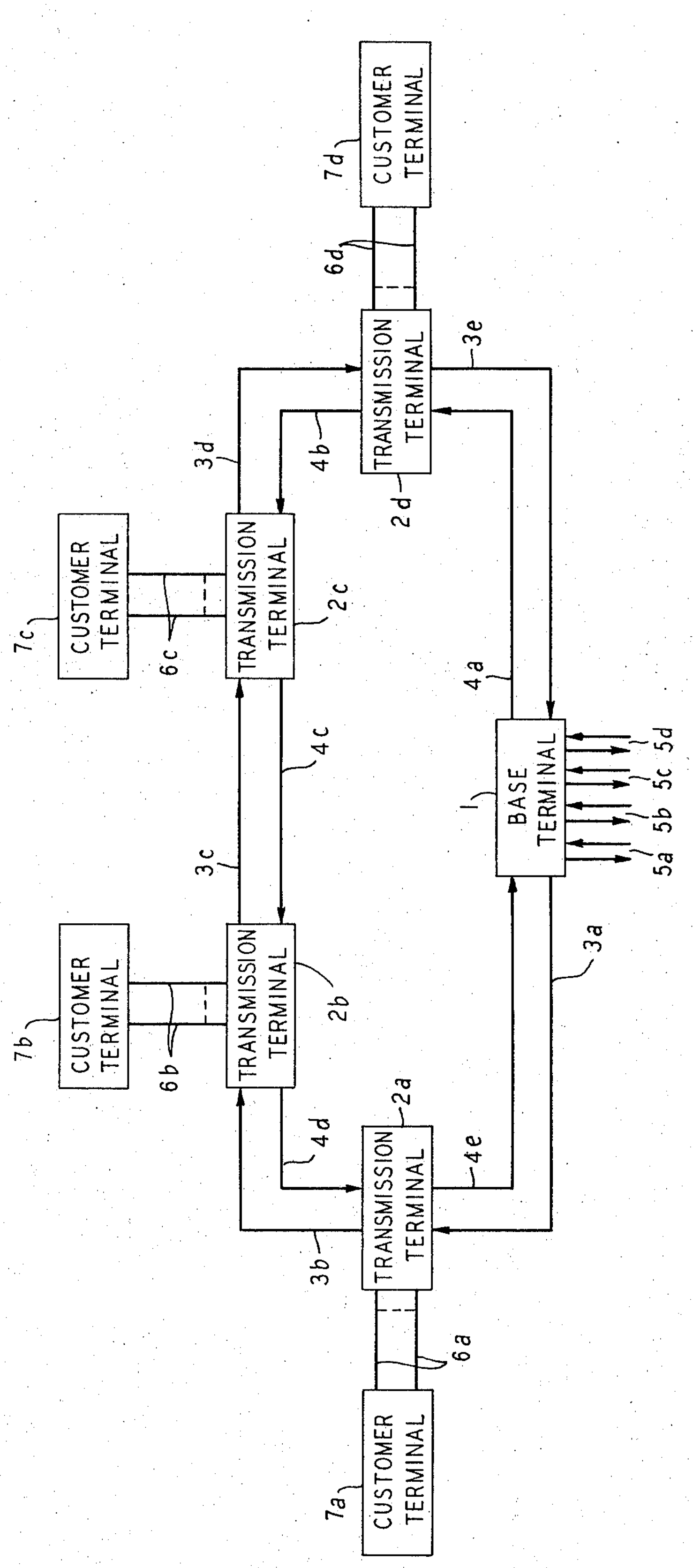
FIG. 1 shows a representation of a loop data transmission arrangement according to this invention.

A loop transmission arrangement employing applicants' invention is shown in FIG. 1. Each transmission terminal 2 is connected by means of lines 6 to a customer terminal 7 such as a telephone or a teletypewriter. In addition, each transmission terminal 2 is serially connected to the other transmission terminals 2 and to the base terminal 1 by means of the lines 3 and 4. More specifically, lines 3*a*, 3*b*, 3*c*, 3*d*, and 3*e* represent transmission facilities comprising what will be referred to as the primary transmission line 3. Similarly, the lines 4*a*, 4*b*, 4*c*, 4*d*, and 4*e* represent the transmission facilities comprising the secondary transmission line 4. These two transmission lines serially connect all the transmission terminals 2 to the base terminal 1. It should be noted that the transmission direction for signals transmitted on the primary line 3 is opposite the transmission direction for signals transmitted on the secondary line 4. As a result, all of the transmission terminals 2 are serially connected in a pair of independent, parallel, opposite transmission direction loops.

The data transmitted from the base terminal 1 over the lines 3 and 4 is time-divided. A synchronization pulse is transmitted followed by time slots, one of which is assigned to each transmission terminal 2. For this particular illustrative embodiment, pulse width modulation (PWM) is employed; however, it should be understood that the form of modulation is not important to the invention. Each transmission terminal 2 receives data signals on the primary line 3, extracts data signals appearing in its assigned time slot, and inserts in that time slot data signals for transmission to the base terminal 1. In the absence of faulty transmission facilities on either line 3 or 4, data transmitted by the base terminal 1 over the secondary line 4 is unchanged by any of the transmission terminals 2. Thus, the data signals transmitted by the base terminal 1 over the facility represented by the line 4*a* are the same data signals received by the base terminal 1 over the facility represented by the line 4*e*.

The line pairs 5 (FIG. 1) may be, as in the case of telephone circuits, trunks connecting to a central office switching machine. In this particular illustrative embodiment the line pair 5*a* is uniquely associated with the transmission terminal 2*a* and the customer terminal 7*a*. Similarly, the line pair 5*b* is uniquely associated with the transmission terminal 2*b* and the customer terminal 7*b*, etc.

As was noted above, apparatus is provided for responding to a failure of a transmission facility such as the transmission facility represented by the line 3*c*. To more easily understand the operation of applicants' invention in the presence of a fault, a discussion of the particular apparatus contained in a transmission terminal 2 and its operation under fault conditions will first be presented. Thereafter, the control apparatus in the base terminal 1 and its operation will be discussed followed by a discussion of the operation of the loop transmission system upon the occurrence of a transmission fault.

TRANSMISSION TERMINAL

Figure 2:
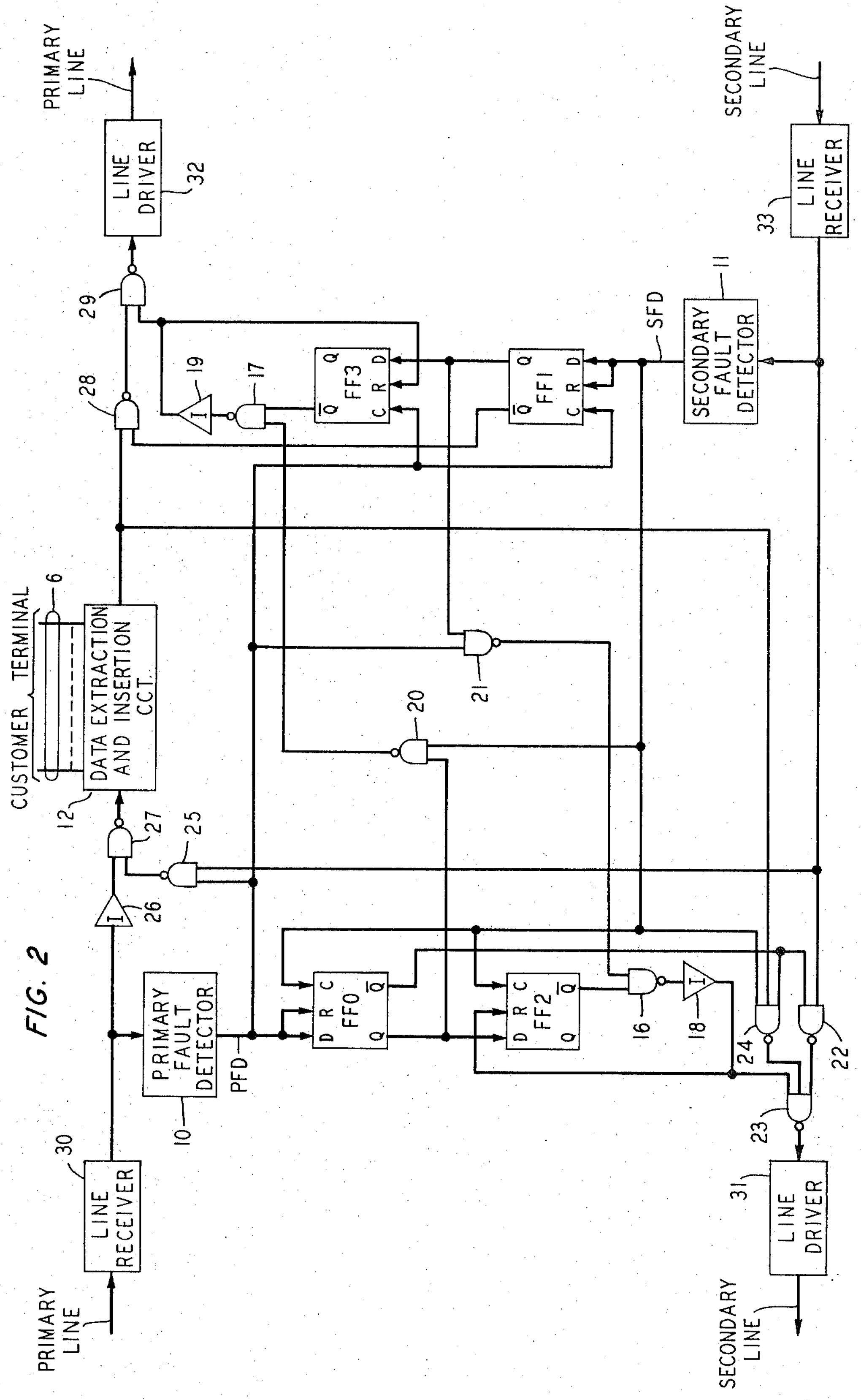
FIG. 2 shows a block diagram representation of a transmission terminal shown in FIG. 1.

An illustrative transmission terminal 2 is shown in FIG. 2. It will be recalled that pulse width modulated (PWM) data signals are received over the primary and the secondary lines. Under this condition, both of the NAND gates 22 and 23 are enabled such that the data signals received on the secondary line by the line receiver 33 are retransmitted on the secondary line to the next transmission terminal 2 (FIG. 1) by the line driver 31 (FIG. 2). Such is not the case with the data received on the primary line, however, since in fault-free operation, data signals received on the primary line are processed to extract signals intended for the particular transmission terminal and to insert signals to be transmitted to the base terminal.

Figure 4:
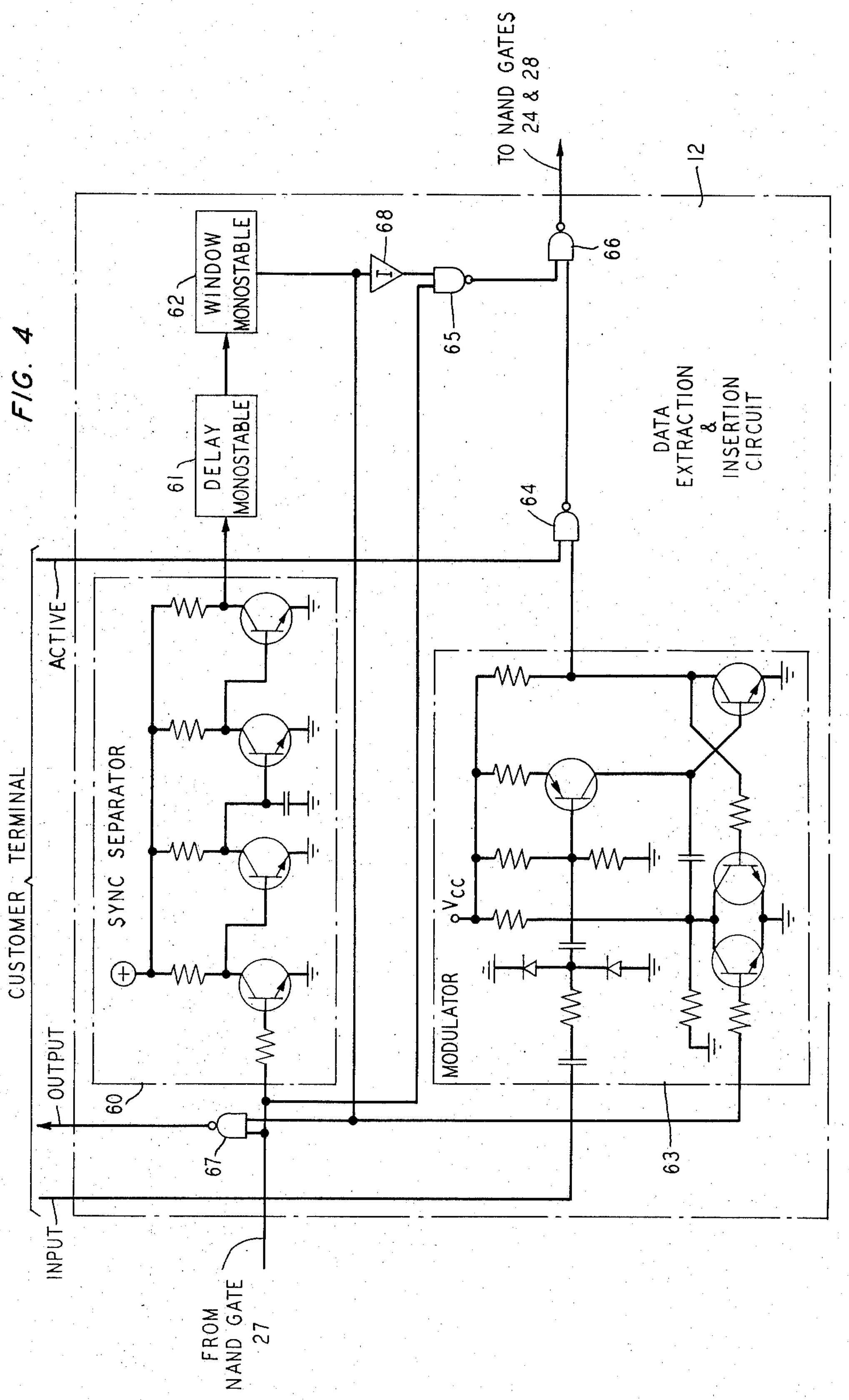
FIG. 4 shows a representation of the data extraction and insertion circuit shown in FIG. 2.
Figure 7:
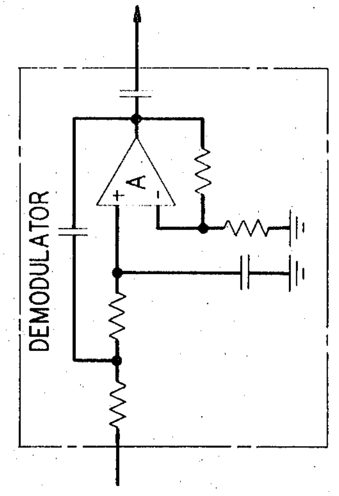
FIG. 7 shows a schematic diagram of the demodulator shown in FIG. 6H.

More specifically, the NAND gate 27 is enabled by a "1" signal from the NAND gate 25 and the data signals received on the primary line by the line receiver 30 are applied through the inverter 26 and the NAND gate 27 to the data extraction and insertion circuit 12. A representation of the circuit 12 is shown in FIG. 4. The particular data extraction and insertion circuit 12 shown in FIG. 4 is suited to operate with customer terminals, such as four-wire telephone trunk circuits which have separate output and input signal lines and a logic signal output for indicating if the customer terminal is in an active state, such as off-hook.

In operation, the PWM signals from NAND gate 27 are applied to the sync separator 60 (FIG. 4) which generates an output "1" pulse when it detects an input pulse of sufficient time duration to indicate that it is a synchronization pulse. The output pulse generated by the sync separator 60 is applied to the delay monostable 61, of a type known in the prior art. The delay monostable 61 generates an output "1" pulse with a time duration uniquely associated with the particular transmission terminal 2 (FIG. 1) of which the data extraction and insertion circuit (FIG. 4) is part. The duration of the pulse from the monostable 61 is chosen to be equal to the time interval in the PWM input signal from the termination of a synchronization pulse to the beginning of the time slot assigned to the particular transmission terminal 2 (FIG. 1). When the pulse generated by the delay monostable 61 (FIG. 4) terminates, the window monostable 62, also known in the prior art, generates an output "1" pulse with a duration equal to that of one time slot. This pulse enables the NAND gate 67 to pass the signal appearing in the current time slot of the PWM input signal to the customer terminal. In addition, it triggers the modulator 63 to sample the signal from the customer terminal and to generate a PWM "1" pulse having a width indicative of the sampled signal amplitude. It should be noted that a pulse is generated even if the signal from the customer terminal is zero. This PWM "1" pulse is applied to an input of the NAND gate 64. If the customer terminal is off-hook or otherwise active, as indicated by a "1" signal appearing on the active line from the customer terminal, the NAND gate 64 is enabled and the PWM pulse is inverted and applied to an input of the NAND gate 66. Otherwise, the pulse is inhibited by the NAND gate 64.

It should be noted that the PWM signals from the NAND gate 27 (FIG. 2) are also applied to an input of the NAND gate 65 (FIG. 4) whose output is applied to the other input of the NAND gate 66. The other input of the NAND gate 65 is driven by the output of the window monostable 62 after inversion in the inverter 68. Thus, the NAND gate 65 is enabled to apply the PWM signals from NAND gate 27 (FIG. 2) to the NAND gate 66 (FIG. 4) except when the output of the window monostable 62 is equal to "1" and the output of the inverter 68 is equal to "0" during the time slot for this particular transmission terminal. It should be recalled that it is during that time slot that a pulse is generated by the modulator 63 and appears at the output of the NAND gate 64 if the customer terminal is active. In effect, the NAND gate 66 combines the PWM signals from the NAND gate 27 (FIG. 2) less the signals originally appearing in the time slot for this transmission terminal with the PWM pulse at the output of gate 64 (FIG. 4). The output signals from the NAND gate 66 comprise the output PWM signals of the data extraction and insertion circuit 12 which are applied to inputs of the NAND gates 24 and 28 (FIG. 2).

In the above discussion it was noted that the data extraction and insertion circuit (FIG. 4) operates upon signals from the output of the NAND gate 27 (FIG. 2). The inputs to the NAND gate 27 are affected by the previously mentioned fault detection and control circuitry. Therefore, attention is now turned to a discussion of that fault detection and control circuitry. The input signals to the NAND gate 27 will be developed in connection with this discussion.

Figure 5:
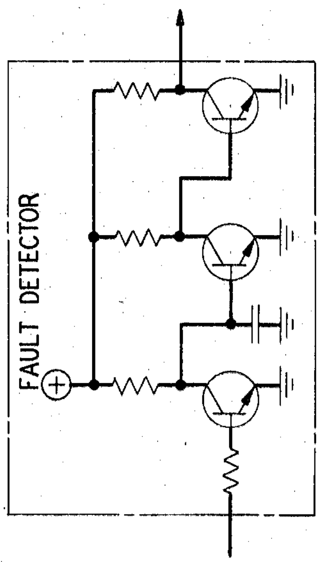
FIG. 5 shows a schematic diagram of the fault detector shown in FIGS. 2 and 3.

It can be seen in FIG. 2 that a primary fault detector 10 of a type shown in FIG. 5 monitors the reception on the primary line (FIG. 2). In addition, the secondary fault detector 11 monitors the reception on the secondary line. When data signals are not received on a monitored line within a selected interval, the appropriate fault detector generates a "1" signal at its output.

It is important to note in FIG. 2 that a plurality of flip-flops of the D type are utilized within the transmission terminal for storing signals, among which are the signals from the fault detectors 10 and 11. In order to more easily understand the operation of these flip-flops a description of the operation of the transmission terminal will be presented based on an assumed sequence of outputs from the fault detectors 10 and 11.

For the immediately following discussion it is assumed that the output signal from the primary fault detector 10, specifically the signal PFD, is initially equal to "0," indicating proper reception on the primary line, and becomes equal to "1," indicating faulty reception on the primary line. Thereafter, with the signal PFD equal to "1," the signal SFD, the output signal from the secondary fault detector 11, is assumed to become equal to "1." It is also assumed that with the signal PFD still equal to "1," the signal SFD returns to "0" indicating that data reception has returned to normal on the secondary line. With the above assumed sequence of events, it should be apparent that the data signal reception on the primary line is assumed to become faulty and to remain faulty while, subsequently, the data signal reception on the secondary line is assumed to become faulty but to return to normal. The significance of these assumptions will become clear in the discussion of the loop operation of applicants' invention.

Under the above assumed sequence of events, all of the flip-flops FFO, FF1, FF2, and FF3 are initially in the reset state, with the signals of the respective outputs equal to "0." When the primary fault detector 10 generates the signal PFD equal to "1," the NAND gate 25 is enabled, permitting data signals received on the secondary line to pass in inverted form to an input of the NAND gate 27. The other input of the NAND gate 27 is driven by the inverter 26 to which the data signals from the primary line are applied. It has already been noted that since the signal PFD is equal to "1," no data signals are being received on the primary line. Therefore, the signal at the output of the inverter 26 is equal to "1." As a result, the inverted secondary line data signals through the NAND gate 25 are inverted again by the NAND gate 27 and applied to the data extraction and insertion circuit 12. The circuit 12 operates upon the data signals received from the secondary line in the manner previously described. The output signals from the data circuit 12 are applied to an input of the NAND gate 28 which is enabled by the "1" signal applied to its other input from the $\overline{Q}$ output of the flip-flop FF1. As a result, the data appearing at the output of the data extraction and insertion 12 is inverted by NAND gate 28 and is applied to an input of the NAND gate 29.

It should be observed that the other input of the NAND gate 29 is driven by the inverter 19 which, in turn, is driven by the output of the NAND gate 17. Under the assumed conditions the signal at the $\overline{Q}$ output of the flip-flop FF3, driving one of the inputs of the NAND gate 17, is equal to "1." In addition, the signal at the output of the NAND gate 20 driving the other input of the NAND gate 17 is also equal to "1" since one of the inputs of the NAND gate 20 is driven by the "0" signal at the Q output of the flip-flop FFO. Therefore, the signal at the output of the NAND gate 17 is equal to "0" and, as a result, the signal at the output of the inverter 19 is equal to "1." Consequently, the NAND gate 29 is enabled to invert the signals appearing at the output of the NAND gate 28 and apply them to the line driver 32 for transmission on the primary line.

From the above discussion it should be noted that the occurrence of the signal PFD equal to "1" resulted in the data signals received on the secondary line being substituted for the data signals normally received on the primary line. More specifically, the data signals received on the secondary line are operated upon by the data extraction and insertion circuit 12 to obtain data signals for the customer terminal and to be modified by the data signals from the customer terminal for transmission over the primary line to the base terminal 1 (FIG. 1).

It was assumed above that subsequent to the change of the signal PFD (FIG. 2) from "0" to "1" and without its further change, the signal SFD becomes equal to "1" indicating that reception over the secondary line is faulty. It should be noted that the fault detector signal PFD equal to "1" is applied to the D input of the flip-flop FFO. Since the signal SFD is applied to the C input of the flip-flop FFO, the flip-flop FFO assumes the set state at the transition from "0" to "1" for the signal SFD.

To appreciate the results of the setting of the flip-flop FFO, it should be recalled that the previously mentioned gate 20 is driven by the signal at the Q output of the flip-flop FFO. In addition, the gate 20 is also driven by the signal SFD which is equal to "1." Since the signal at the Q output of the flip-flop FFO is now also equal to "1," the signal at the output of the NAND gate 20 is now equal to "0." This signal is applied to one of the inputs of NAND gate 17 resulting in its output being equal to "1." As a result, the signal at the output of the inverter 19 is now equal to "0," and the output signal from the NAND gate 29, which is responsive to the output of the inverter 19, is equal to "1." Thus, a "1" signal replaces the transmission of data signals on the primary line.

In addition, it should be noted that the "0" signal on the $\bar{Q}$ output of the flip-flop FFO disables the NAND gate 22 preventing, for the first time, the data signals received on the secondary line from being applied to the NAND gate 23 and, thus, preventing transmission of those data signals on the secondary line by the line driver 31.

From the above discussion it should be observed that as a result of the occurrence of the signal SFD equal to "1" following the occurrence of, but coincident with, the signal PFD equal to "1," a "1" signal is transmitted over the primary line in place of data signals. In addition, transmission over the secondary line of data signals received on the secondary line is inhibited by the disabling of the NAND gate 22 as a result of the set state of the flip-flop FFO.

It is now to be assumed, in accordance with the sequence of events previously described, that while the signal PFD remains equal to "1," indicating that the reception over the primary line is still defective, the signal SFD becomes equal to "0," indicating that the reception over the secondary line has returned to normal. At this point it is first to be noted that the signal at the output of the NAND gate 20 is now equal to "1" since the input driven by the signal SFD is equal to "0." Therefore, both inputs to the NAND gate 17 are equal to "1" and the signal at the output of the NAND gate 17 is equal to "0." As a result, the signal at the output of the inverter 19 is equal to "1." Consequently, the output of the NAND gate 29 is no longer fixed at a "1" signal and signals applied to the other input of the NAND gate 29 will be applied in inverted form to the line driver 32 for transmission on the primary line.

In addition, it should be noted that since transmission on the secondary line is again normal, data signals received on the secondary line pass through the still enabled gates 25 and 27 (FIG. 2) to the data extraction and insertion circuit 12 where they are processed as before described. The signals at the output of the data extraction and insertion circuit 12 are applied to the NAND gate 28 which is also still enabled and to the NAND gate 29 for transmission on the primary line as above described. It is also important to note that the output of the circuit 12 is also applied to the NAND gate 24. However, the NAND gate 24 is disabled by the "0" signal on the $\bar{Q}$ output of the flip-flop FFO. Therefore, no transmission of the signals at the output of the data extraction and insertion circuit 12 occurs on the secondary line.

It has been shown above that as a result of the assumed sequence of signals from the primary fault detector 10 and the secondary fault detector 11, the transmission terminal (FIG. 2) has assumed a state in which only the flip-flop FFO is in the set state. In fact, the flip-flop FFO will remain in the set state until reset by the PFD signal from the primary fault detector 10 again equalling "0." Until such time, however, data received from the secondary line will be looped back through the data extraction and insertion circuit 12 to the primary line and will not be transmitted on the secondary line.

It is interesting here to note the response of the transmission terminal (FIG. 2), in the state established by the above assumed sequence of events, to the second occurrence of the signal SFD = "1" from the secondary fault detector 11. It will be recalled that the signal at the Q output of the flip-flop FFO is equal to "1." This signal is applied to the D input of the flip-flop FF2. It should be noted that the signal SFD is supplied to the C input of the flip-flop FF2. Therefore, the transition of the signal SFD from "0" to "1" causes the flip-flop FF2 to assume the set state. As a result, the "0" signal on the $\bar{Q}$ output of the flip-flop FF2 which is applied to one of the inputs of the NAND gate 16 produces a "1" signal on the output of the NAND gate 16. This "1" signal is applied to the inverter 18 which is applied to one of the inputs of the NAND gate 23 and also the reset input of the flip-flop FF2. In consequence, the flip-flop FF2 is reset. However, the "0" signal appearing on one of the inputs of the NAND gate 23 remains for a time duration equal to two gate delays. As a result, a "1" signal pulse of a duration equal to two gate delays is applied to the line driver 31 by the NAND gate 23 and appears on the secondary line. As will become apparent in the subsequent discussion, this brief pulse is used to reset the circuitry in the transmission terminal 2 (FIG. 1) on the other side of a previously faulty transmission facility in the primary line 3 after the facility has been repaired.

Having described the operation of the transmission terminal (FIG. 2) under the sequence of events assumed above in which the signal PFD becomes and remains equal to "1" and the signal SFD becomes equal to "1" and returns to the value "0" shortly thereafter, the operation of the remainder of the circuitry in the transmission terminal 2 under a sequence of events in which the roles of the primary and secondary fault detectors are reversed, should be apparent. Specifically, if it is assumed that the signal SFD becomes equal to "1" and remains so, followed by the signal PFD becoming equal to "1" and shortly thereafter returning to "0," the operation of the flip-flop FF1 is similar to the operation of the flip-flop FFO previously described. As a result, while the signal PFD is equal to "1" and the signal SFD is equal to "1," a "1" signal is transmitted on the secondary line from the transmission terminal. Subsequently, when the signal PFD becomes equal to "0," while the signal SFD remains equal to "1," the output signals from the data extraction and insertion circuit 12 reflecting the data supplied on the primary line as modified by the circuit 12 are applied to line driver 31 through the enable NAND gate 24 and the NAND gate 23.

Similarly, if briefly the signal PFD again returns to "0," the flip-flop FF3, for a period of two gate delays, generates a signal through the NAND gate 17 and the inverter 19 producing a short pulse at the output of the NAND gate 29 and on the primary line by means of the line driver 32. Again, it need only be mentioned at this point that this brief pulse is to be used in resetting the circuitry in the transmission terminal on the other side of a previously faulty transmission facility in the secondary line (FIG. 1) after it has been repaired.

BASE TERMINAL — TRANSMISSION LOOP CONTROL FUNCTION

Figure 3:
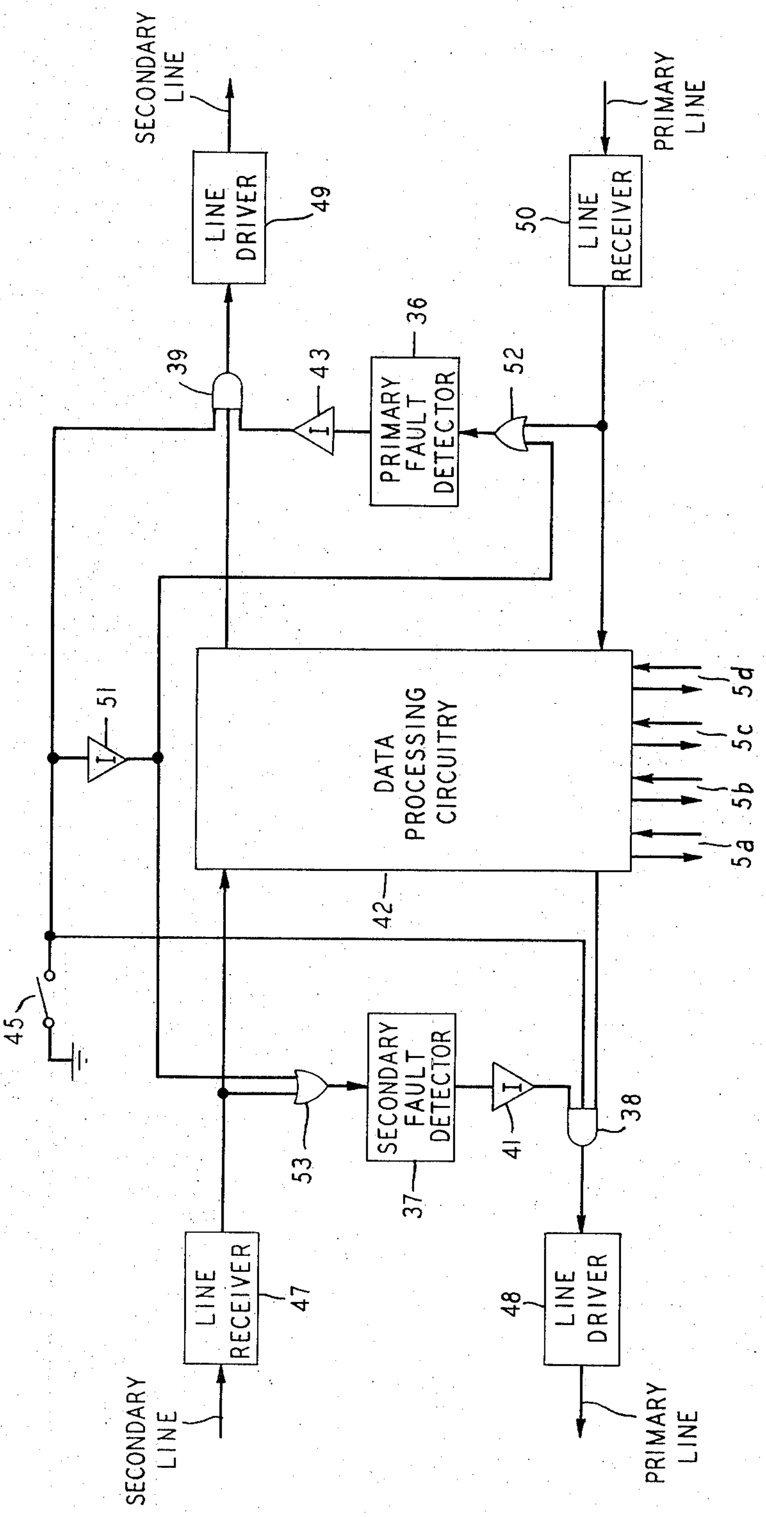
FIG. 3 shows a general block diagram representation of the base terminal shown in FIG. 1.

A simplified representation of the base terminal 1 (FIG. 1) is shown in FIG. 3. The transmission loop control functions of the base terminal in isolating a faulty line facility and subsequently returning it to service after the fault is repaired can be completely discussed using FIG. 3. Discussion of the apparatus for processing data signals required the more complete representation of the base terminal shown in FIG. 6 including FIG. 6A through 6H and will be presented subsequently.

When the signal reception on the primary line is defective for a selected interval of time, the primary fault detector 36 (FIG. 3) generates a "1" signal which is inverted in the inverter 43 and applied to the AND gate 39. As a result, the signal at the output of the AND gate 39 which is applied to the line driver 49, and thus the secondary line, is equal to "0." It should be noted that one of the other inputs to the AND gate 39 is the secondary line output of the data processing circuitry 42. Thus, the result of faulty reception on the primary line is termination of the transmission of signals from the data processing circuitry 42 in the base terminal 1 (FIG. 1) on the secondary line 4.

The operation of the secondary fault detector 37 (FIG. 3) is similar to that of the primary fault detector 36 and when the reception on the secondary line is faulty, the transmission from the base terminal 1 (FIG. 1) on the primary line 3 is terminated.

One additional point should here be noted. The switch 45 (FIG. 3) is provided such that, under manual control, a "0" signal can be applied to both AND gates 38 and 39 simultaneously resulting in the termination of transmission from the base terminal 1 (FIG. 1) on both the primary line 3 and the secondary line 4. The switch 45 (FIG. 3) is used in the loop operation of applicants' invention to reset the transmission terminals adjacent to a faulty transmission facility after the fault has been corrected.

LOOP OPERATION

To illustrate the operation of applicants' invention in the context of a plurality of transmission terminals connected by two independent opposite direction transmission facilities in parallel loops in the presence of a fault in one of those loops, reference is made to FIG. 1 It is assumed that the transmission facility represented by the line 3*c* is defective. It should be noted that the line 3*c* is in the primary line 3. Therefore, following the occurrence of the fault, the transmission terminals 2*c* and 2*d* and eventually the base terminal 1 no longer receive data signals on the primary line 3. Immediately following the fault, however, all transmission terminals 2 still receive data signals on the secondary line 4.

It has already been seen that both the transmission terminals 2 and the base terminal 1 contain fault detectors. It is important here to note that the delay between the cessation of signal reception and the generation of a "1" signal by the fault detectors in the transmission terminals 2 is greater than the delay between cessation of signal reception and generation of a "1" signal by the fault detectors in the base terminal 1. As a result, the fault detectors in the base terminal 1 always react to the existence of a fault before the fault detectors in the transmission terminals 2 react.

Shortly after the occurrence of the assumed fault, the fault detector 36 (FIG. 3) in the base terminal 1 (FIG. 1) generates a "1" signal indicating failure of signal reception on the primary line 3. As previously discussed, generation of this signal results in termination of transmission from the base terminal 1 on the secondary line 4. Therefore, it should be noted that not only has signal reception stopped on the primary line 3 for the transmission terminals 2*c* and 2*d* but it has also stopped for all transmission terminals 2 on the secondary line 4.

Referring now to the transmission terminals 2*c* and 2*d*, it should be apparent that after the time delay associated with the primary fault detectors 10 (FIG. 2) in each terminal, the primary fault detector 10 in each will generate the signal PFD = "1" indicating the failure of signal reception on the primary line 3 (FIG. 1). As previously discussed, each of the terminals 2*c* and 2*d* react to this signal, as long as the respective secondary fault detectors 11 (FIG. 2) do not generate the signal SFD = "1," by gating the signals received on the secondary line to the data extraction and insertion circuit 12 and by gating the output signals from the circuit 12 onto the primary line.

Eventually, however, the termination of transmission by the base terminal 1 (FIG. 1) on the secondary line 4 results in the generation of the signal SFD = "1" in both terminals 2*c* and 2*d*. As previously discussed, the occurrence of this signal following, but coincident with, the signal PFD = "1," as is the case in both terminals 2*c* and 2*d*, results in the setting of the flip-flop FFO (FIG. 2) in each terminal and the inhibiting of data signal transmission on the secondary line by each terminal. It also results in the generation of a "1" signal on the primary line 3 by each terminal. Thus, the transmission terminal 2*c* generates a "1" signal on the line 3*d* and the transmission terminal 2*d* generates a "1" signal on the line 3*e*. The "1" signal generated by the terminal 2*d* is received by the base terminal 1 (FIG. 1). Immediately, the primary fault detector 36 (FIG. 3) in the base terminal 1 (FIG. 1) ceases the generation of the "1" signal which inhibited signal transmission on the secondary line 4. As a result, signal transmission on the secondary line 4 resumes.

In addition, the "1" signal generated by the transmission terminal 2*c* is received by transmission terminal 2*d*. As a result, the fault detector 10 (FIG. 2) in the terminal 2*d* generates the signal PFD = "0" and the flip-flop FFO which was previously in the set state is reset. As a further result, when signals are again received from the base terminal 1 (FIG. 1) on the secondary line 4, specifically line 4*a*, the signals are gated through the terminal 2*d*, to the secondary line 4, specifically line 4*b*. In consequence, the transmission terminal 2*d* has returned to its normal state.

When the data signals comprising the transmission on the secondary line 4 resumed by the base terminal 1 (FIG. 1) are received by the terminal 2*c*, the secondary fault detector 11 (FIG. 2) generates the signal SFD = "0." As previously discussed, with the occurrence of this signal as part of the above discussed sequence, the transmission terminal 2*c* (FIG. 1) replaces the "1" signal it has been transmitting on the primary line 3, with data signals generated by its data extraction and insertion circuit 12 (FIG. 2). It should be recalled that in this state the transmission terminal 2*c* (FIG. 1) gates the data signals received on the secondary line 4 to the input of its data extraction and insertion circuit 12 (FIG. 2).

Thus, from the above discussion it should be observed that the transmission terminal 2*c* has made a connection between the secondary line 4 and the primary line 3, in effect a loop back. As a result, in spite of the transmission fault in the transmission facility represented by the line 3*c*, a closed transmission loop has been created to provide communication between the base terminal 1 (FIG. 1) and the transmission terminals 2*c* and 2*d*.

Turning attention to the transmission terminals 2*a* and 2*b*, it should be recalled that transmission by the base terminal 1 (FIG. 1) on the secondary line 4 is terminated when the base terminal 1 detects loss of signals reception on the primary line 3. In addition, it should also be recalled that upon detection by the terminal 2*c* of loss of reception on the secondary line, having previously detected loss of reception on the primary line, the terminal 2*c* inhibits the transmission on the secondary line 4, specifically the line 4*c*, of signals received on the secondary line 4. It should, therefore, be apparent that as a result of a failure in the facility represented by the line 3*c* (FIG. 1), a stable condition is reached in which no signal transmission occurs over the facility represented by the line 4*c* (FIG. 1). In fact, with respect to the terminals 2*a* and 2*b*, there is no feature of operation which distinguishes this condition from the occurrence of a fault in the facility represented by the line 4*c* initially.

To prevent unnecessary repetition only a brief discussion is presented of the cooperative operation of the base terminal 1 and the transmission terminals 2*a* and 2*b* after transmission over the facility represented by the line 4*c* is terminated. From the above discussion, it should be apparent that the base terminal 1 detects the loss of reception on the secondary line 4 and terminates transmission on the primary line 3. In addition, the loss of signal reception on the secondary line 4 and the subsequent loss of signal reception on the primary line 3 by both transmission terminals 2*a* and 2*b* result in each of the terminals both inhibiting signal transmission to the primary line 3 and generating a "1" signal on the secondary line 4. The "1" signal from the transmission terminal 2*a* results in the resumption of data signal transmission by the base terminal 1 on the primary line 3. The "1" signal on the secondary line 4 from the terminal 2*b* together with the return of signal reception on the primary line 3 restores the terminal 2*a* to its normal state. Finally, the reception of signals on the primary line 3 by the terminal 2*b* results in replacing the "1" signal previously generated by that terminal on the secondary line with data signals from the data extraction and insertion circuit 12 (FIG. 2) of that terminal. Under these conditions the signals gated to the input of the circuit 12 are those received on the primary line 3 (FIG. 1). As a result, a connection between the primary and secondary lines has been accomplished, in effect a loop back. As a further result, a transmission loop has been created connecting the base terminal 1 with the transmission terminals 2*a* and 2*b*.

From the above discussion, it should be observed that, upon the occurrence of a fault in the primary transmission line 3, the loop transmission arrangement reacts to restore communication with all transmission terminals using auxiliary transmission facilities. As a result two transmission loops are created by selectively making data connections between the primary and secondary lines in the transmission terminals adjacent to the fault. It should be noted that similar results would have been obtained if the fault had been in the secondary line 4 or simultaneously in both the primary line 3 and the secondary line 4.

It is now assumed that the facility represented by the line 3*c* (FIG. 1), which was previously faulted, is repaired and it is desired that the loop transmission arrangement be restored to its state prior to the occurrence of the transmission fault. To accomplish this, the switch 45 (FIG. 3) in the base terminal 1 (FIG. 1) is depressed to inhibit data signal transmission from the base terminal 1 on both the primary line 3 and the secondary line 4 for a period of time long enough to result in the generation of "1" signals by the fault detectors 10 and 11 (FIG. 2) in the transmission terminals 2 (FIG. 1). While transmission from the base terminal 1 is inhibited, the "0" signal from the switch 45 (FIG. 3) is supplied through the inverter 51 to the OR gates 52 and 53 to prevent the primary fault detector 36 and the secondary fault detector 37 from generating signals which would also inhibit base terminal transmission.

It should be recalled that due to the previous fault in the transmission facility represented by the line 3*c* (FIG. 1), the transmission terminals 2*b* and 2*c* have made data transmission connections between the primary and secondary lines 3 and 4, respectively. More specifically, the flip-flop FF1 (FIG. 2) in the transmission terminal 2*b* (FIG. 1) is in the set state and the flip-flop FFO (FIG. 2) in the transmission terminal 2*c* (FIG. 1) is also in the set state. It should, therefore, be observed that, in accordance with the previous discussion of a transmission terminal 2 (FIG. 2), when the secondary fault detector 11 generates the signal SFD = "1," as a result of the termination of data transmission on the secondary line 4 (FIG. 1), a brief "1" pulse is transmitted by the terminal 2*c* over the secondary line 4. In addition, as long as the signal SFD = "1" is generated and the flip-flop FFO (FIG. 2) in the terminal 2*c* (FIG. 1) remains set, the terminal 2*c* transmits a "1" signal on the primary line 3 to the transmission terminal 2*d*. The "1" pulse on the secondary line 4 from the transmission terminal 2*c* results in the generation of the signal SFD = "0" in the terminal 2*b* and the resetting of the flip-flop FF1 (FIG. 2) in that terminal. In view of the resetting of the flip-flop FF1 in terminal 2*b* it should be noted that if signals from the terminal 2a (FIG. 1) are subsequently received on the primary line 3 by the terminal 2b, they will be passed through that terminal and to the terminal 2c on the primary line 3. When such signals are received by the terminal 2c, the flip-flop FFO (FIG. 2) in that terminal (FIG. 1) will be reset.

The transmission terminals 2a and 2d are also affected by the termination of data signal transmission from the base terminal 1. The terminal 2a experiences loss of signal reception on the primary line 3 and the terminal 2d experiences loss of signal reception on the secondary line 4. As a result of the loss of signal reception on the primary line 3 by the terminal 2a, the terminal 2a, the manner above described, makes a data connection between the secondary line 4, from the terminal 2b, and the primary line 3, to the terminal 2b. Thus, when the above described "1" pulse is generated by the terminal 2c, passes the terminal 2b and is received by the terminal 2a, it is transferred to the primary line 3 and transmitted back to the terminal 2b. When the "1" pulse is received by the terminal 2b on the primary line 3 it is retransmitted by the terminal 2b to the terminal 2c on the primary line 3. As above mentioned, the reception of the "1" pulse by the terminal 2c resets the flip-flop FFO (FIG. 2) in that terminal (FIG. 1). Consequently, signals subsequently received by the terminal 2c on either the primary line 3 or the secondary line 4 are retransmitted by that terminal on the respective line.

It was noted above that the transmission terminal 2d is also affected by the termination of data signal transmission from the base terminal 1. More specifically, the terminal 2d effects a data connection between the primary line 3, from the terminal 2c, and the secondary line 4, to the terminal 2c. As a result, in view of the data connection made by the terminal 2a, a continuous data loop exists between the data terminals 2a and 2d including the terminals 2b and 2c. Moreover, the previously described "1" pulse circulates around this loop preventing the transmission terminal fault detectors associated with lines within the loop from generating "1" signals.

When the switch 45 (FIG. 5) is released, data signals are again transmitted by the base terminal 1 (FIG. 1) on both the primary line 3 and the secondary line 4. When these data signals are received by the transmission terminals 2a and 2d, respectively, the fault detectors 10 and 11, respectively, in the two terminals generate the signals PFD and SFD equal to "0." As a result, the data connections made by the terminals 2a and 2d between the primary line 3 and the secondary line 4 are terminated. Moreover, since the flip-flops in the transmission terminals 2 are, at this point, all in the reset state, the entire loop (FIG. 1) has returned to the what can be referred to as its normal state.

It should be noted that in the above discussion it was implicitly assumed that the transmission delays in the transmission loop (FIG. 1) were such that the previously mentioned "1" pulse would be generated by the terminal 2c rather than the terminal 2b. The same result would have been reached had the terminal 2b generated the "1" pulse or had both terminals 2b and 2c generated "1" pulses.

BASE TERMINAL — DATA SIGNAL PROCESSING FUNCTIONS

Figure 6:
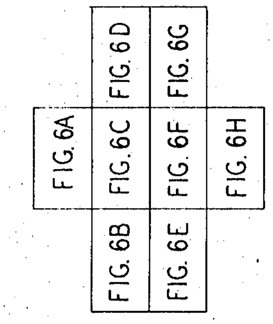
FIG. 6, including
Figure 6A:
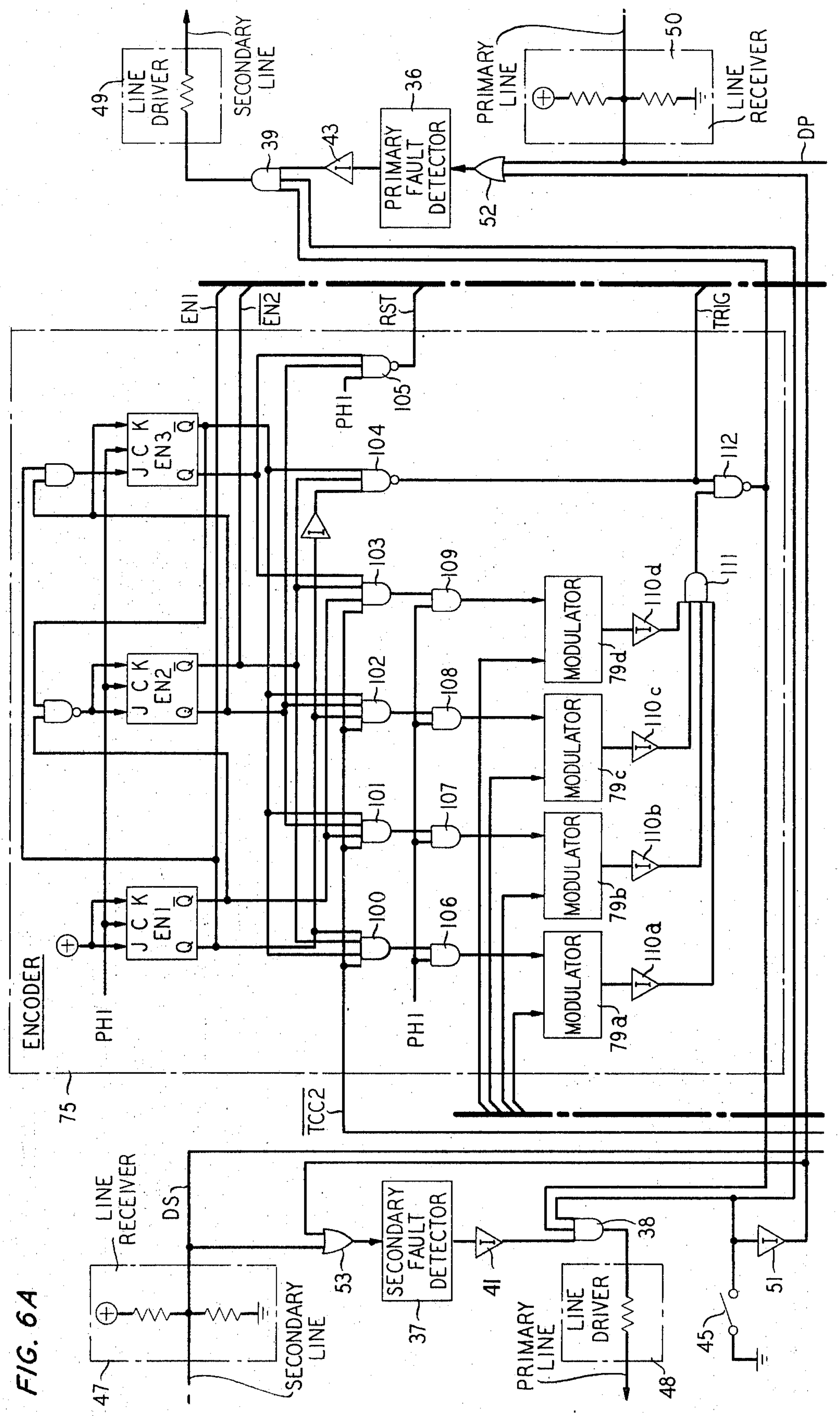
FIGS. 6A through 6H, shows a detailed schematic diagram of the base terminal shown in FIGS. 1 and 3.
Figure 6B:
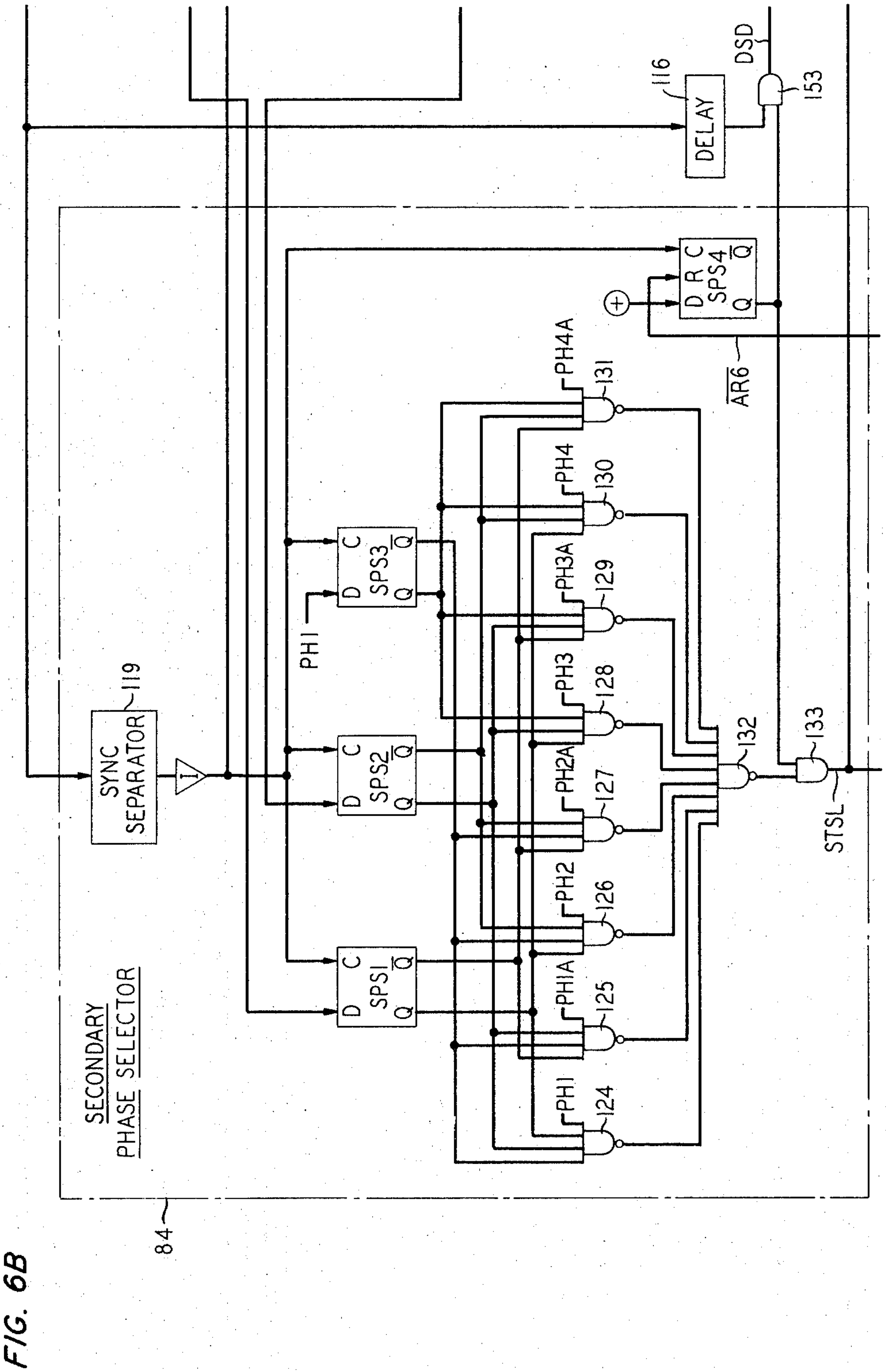

A detailed schematic diagram of the base terminal 1 (FIG. 1) is shown in FIG. 6 including FIG. 6A through 6H. It will be recalled that data signals are transmitted in pulse width modulated form from the base terminal 1 (FIG. 1) over the primary line 3 and the secondary line 4 to all of the transmission terminals 2. The data signals transmitted are encoded samples of incoming signals on the lines 5. The sampling of the lines 5 and the generation of the pulse width modulated data signals are accomplished in the encoder 75 (FIG. 6A).

Figure 6C:
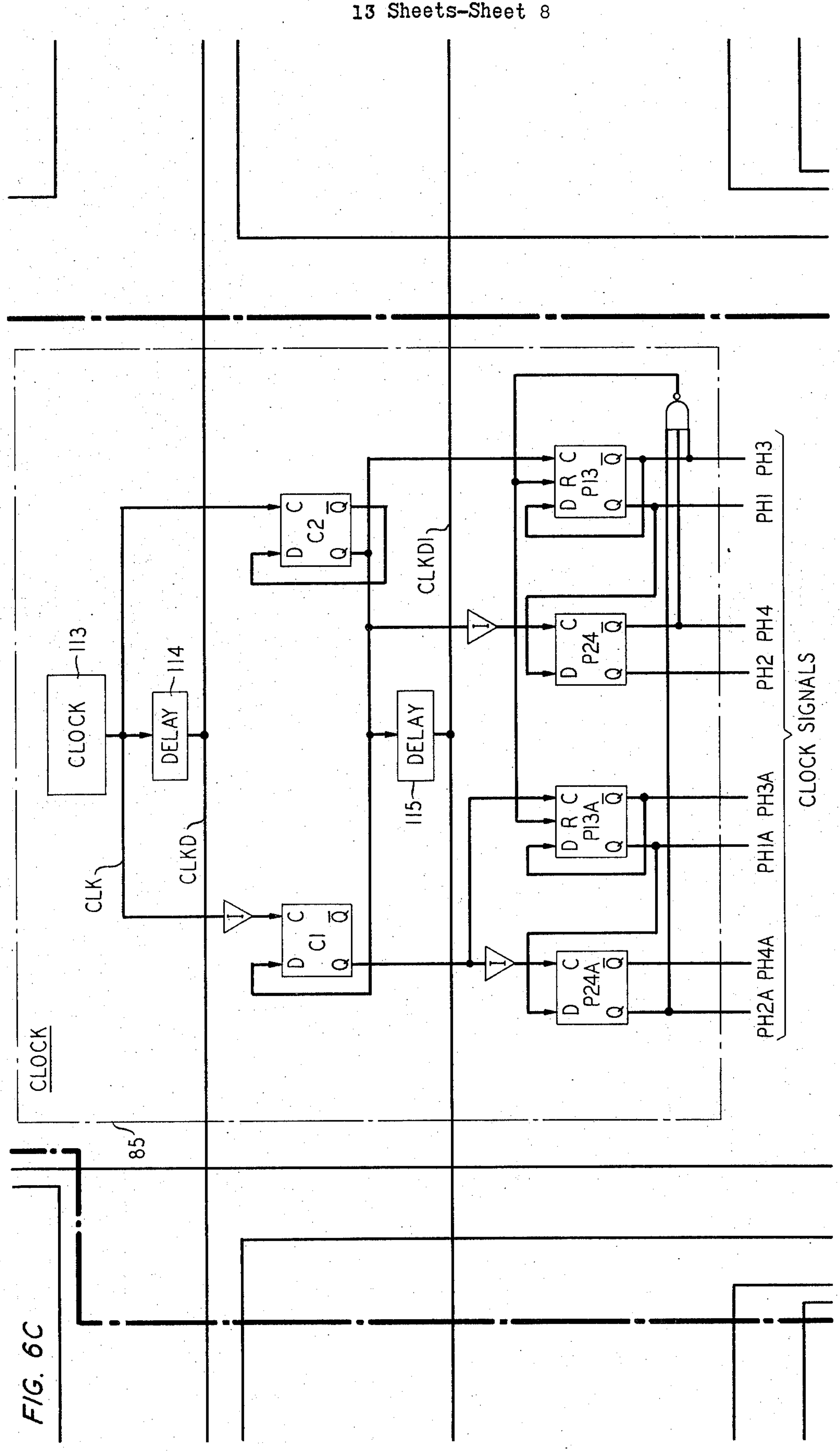

More specifically, the signals on the lines 5a, 5b, 5c, and 5d (FIG. 6H) are respectively applied to the modulators 79a, 79b, 79c, and 79d (FIG. 6A). Each of the respective modulators, which are similar to the modulator 63 (FIG. 4), is enabled to generate a width modulated pulse at a time determined by timing circuitry, comprising flip-flops EN1, EN2, and EN3, and gates 100 through 104, which is, in turn, responsive to clock signals from the clock 85 (FIG. 6C). Thus, in a manner known in the prior art, an inverted synchronization pulse of time duration longer than the maximum duration of a modulated pulse is generated at the output of the NAND gate 104 and applied to an input of the NAND gate 112. The generation of the inverted synchronization pulse and its application to the NAND gate 112 is followed by the sequential generation of width modulated pulses by the modulators 79 which are applied through the inverters 110 and the AND gate 101 to the gate 112. This sequence of pulses is applied by the NAND gate 112 to the AND gates 38 and 39 which, in turn, generate signals which are applied to the line drivers 48 and 49 for transmission on the primary line and the secondary line, respectively.

As has been described above, transmission terminals 2 (FIG. 1) normally transmit data signals representative of samples of input signals from their respective customer terminals 7 over the primary line 3 to the base terminal 1. Thus, under normal operation, the base terminal 1 receives all signals containing customer terminal data on the primary line 3. When, however, a transmission fault occurs, data connections are effected between the primary line 3 and the secondary line 4 to restore data communication with all transmission terminals 2. When this occurs, pulse width modulated signals from transmission terminals 2 are no longer all received on the primary line 3 by the base terminal 1. Specifically, assuming as above a transmission fault in the facility represented by the line 3c, customer terminal data signals from transmission terminals 2a and 2b are transmitted to the base terminal 1 over the secondary line 4 while customer terminal data signals from transmission terminals 2c and 2d are still transmitted to the base terminal 1 over the primary line 3.

It should also be observed that the pulse width modulated data signals from each transmission terminal 2 (FIG. 1) must be gated to the demodulator 80 (FIG. 6H) associated with the line pair 5 dedicated to the respective transmission terminal 2 (FIG. 1). To ensure the proper gating of signals received on the primary line 3 and the secondary line 4 to the appropriate demodulator 80 (FIG. 6H), it is necessary for the base terminal (FIG. 6) to determine which transmission terminals are transmitting customer terminal data signals to it on each of the two lines. To provide information required to make this determination, a test transmission is periodically initiated on both the primary line 3 (FIG. 1) and the secondary line 4 by the base terminal 1.

More specifically, at an interval determined by the monostable 147 (FIG. 6F) in the test control circuit 82 the flip-flop TCC1 is clocked to the set state. The Q output of the flip-flop TCC1 drives the D input of the flip-flop TCC2. The C input of that flip-flop is driven by the signal TRIG, which is the inverted synchronization pulse signal. As a result, at the termination of the first synchronization pulse after the flip-flop TCC2 is clocked to the set state, the flip-flop TCC2 is clocked to the set state. The flip-flop TCC3 is also clocked to the set state by the occurrence of the Q = "1" output of flip-flop TCC2. It should be noted that the $\overline{Q}$ = "0" output of flip-flop TCC2 is applied to an input of each of the AND gates 100 through 103 disabling them from generating the timing signals which ultimately trigger the modulators 79. As a result, no modulator pulses are generated. Thus, the test transmission consists of only a synchronization pulse.

Figure 6D:
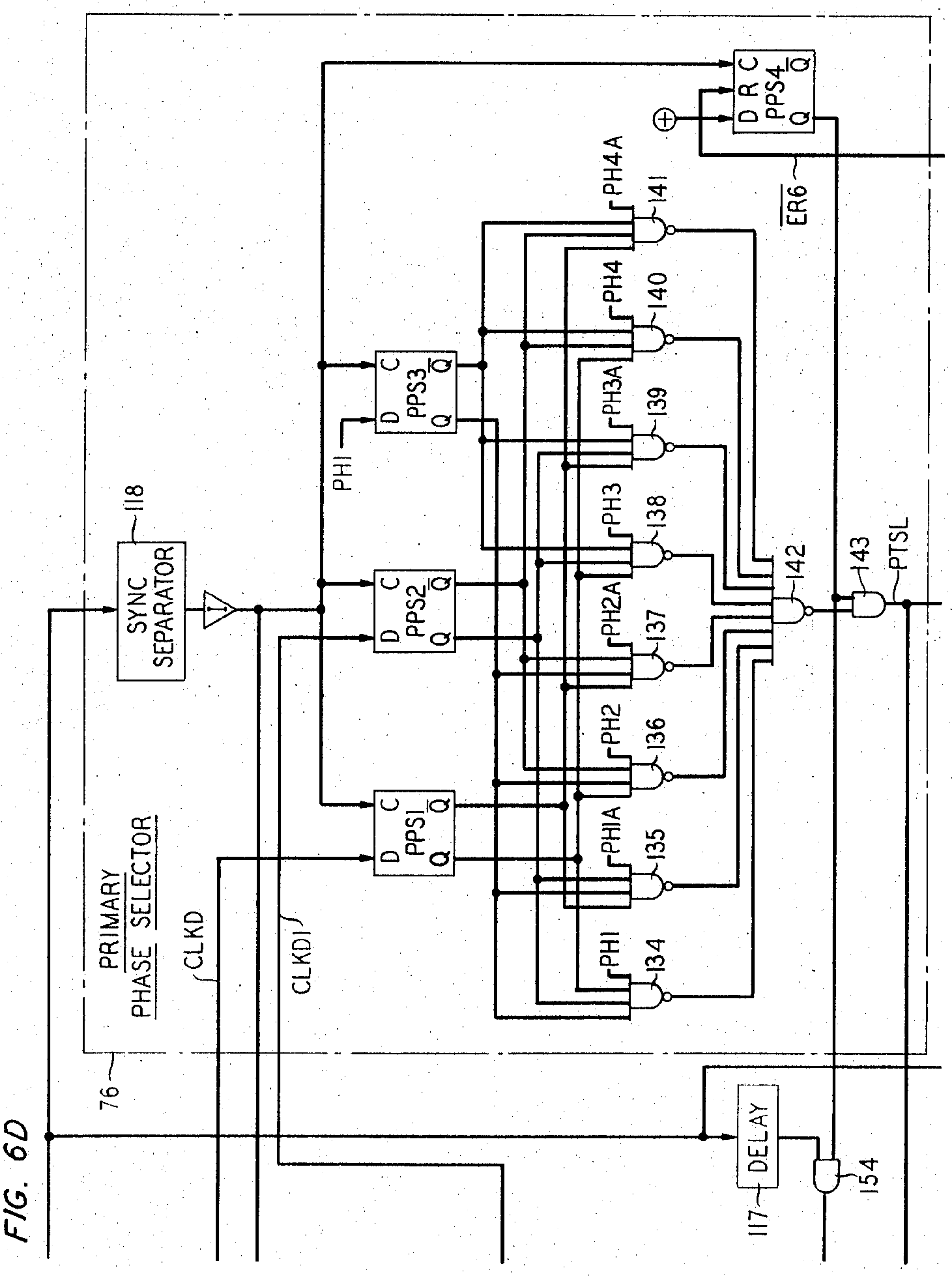
Figure 6E:
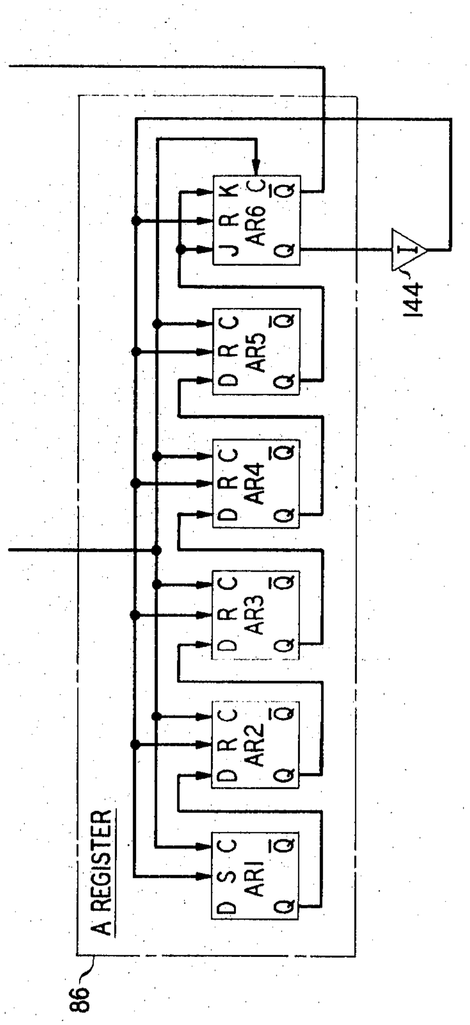
Figure 6F:
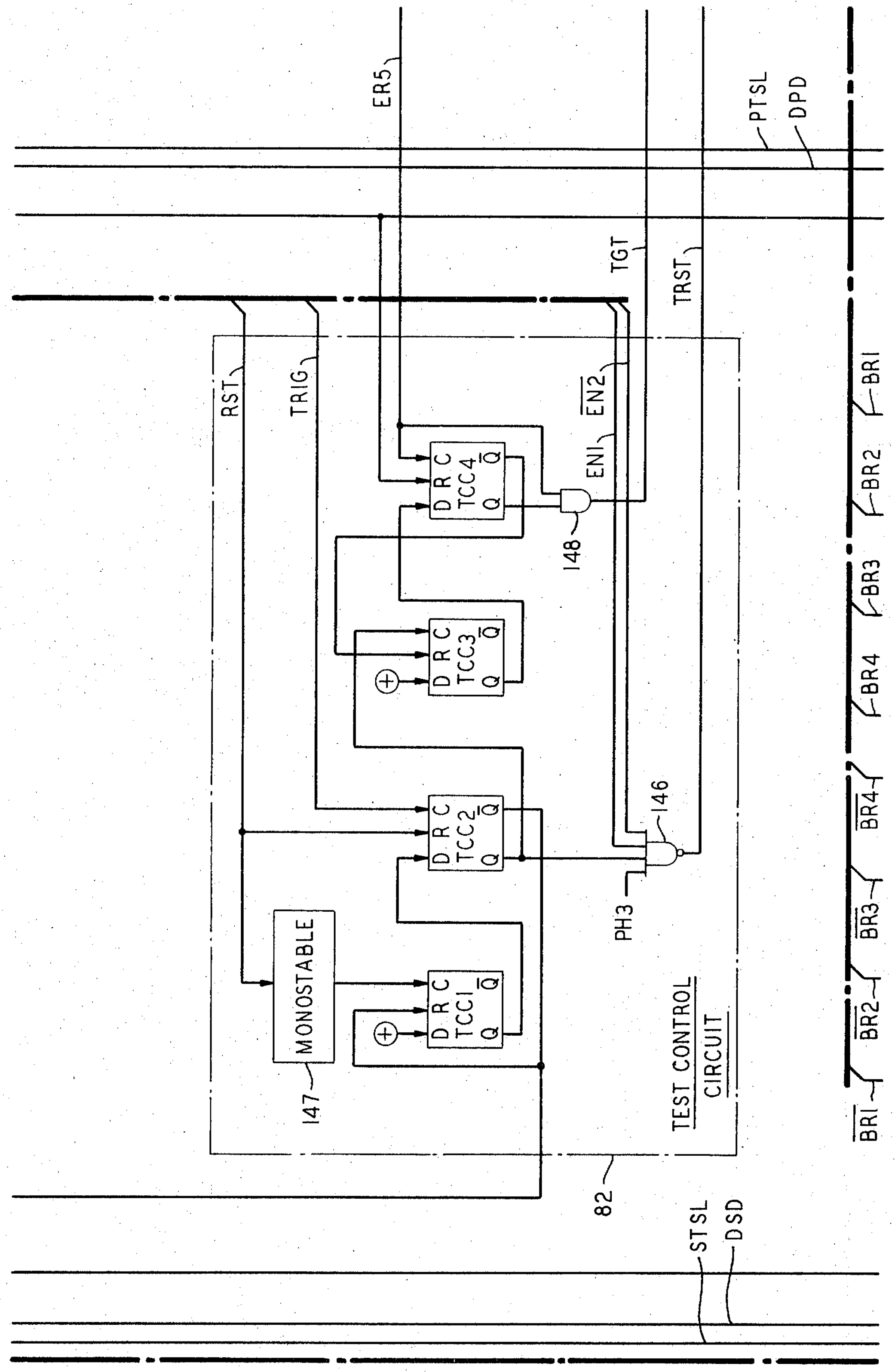

When a transmission terminal 2 (FIG. 1) associated with an active customer terminal 7 processes the test transmission, it inserts in its assigned time slot a width modulated pulse representative of the amplitude of the signal from the associated customer terminal 7. It should be noted that irrespective of the amplitude of the modulation some pulse is produced. Thus, each active customer terminal 7 which receives the test transmission produces a pulse of some width in its time slot. Therefore, when the test transmission returns to the base terminal 1 (FIG. 1), it contains a pulse in the assigned time slot for each transmission terminal 2 both associated with an active customer terminal 7 and through which the test transmission passed. For example, if the test message is received by the base terminal 1 on the primary line 3 and the time slots assigned to transmission terminals 2*c* and 2*d* contain pulses, it is assumed that future data transmissions from those transmission terminals will be received on the primary line 3. It is also assumed either that the customer terminals associated with the transmission terminals 2*a* and 2*b* are inactive or that there has been a transmission fault and data signals from those transmission terminals must now be received on the secondary line 4. As a result, at least until another test transmission is initiated, only signals received on the primary line 3 in the time slots assigned to the transmission terminals 2*c* and 2*d* are supplied by the NAND gates 165 (FIG. 6H) and 166 to the demodulators 80*c* and 80*d*, respectively, (FIG. 6H). Similarly, only signals received on the secondary line 4 (FIG. 1) in the time slots assigned to the transmission terminals 2*a* and 2*b* are supplied by the NAND gates 163 (FIG. 6H) and 164 to the demodulators 80*a* and 80*b*, respectively.

Figure 6G:
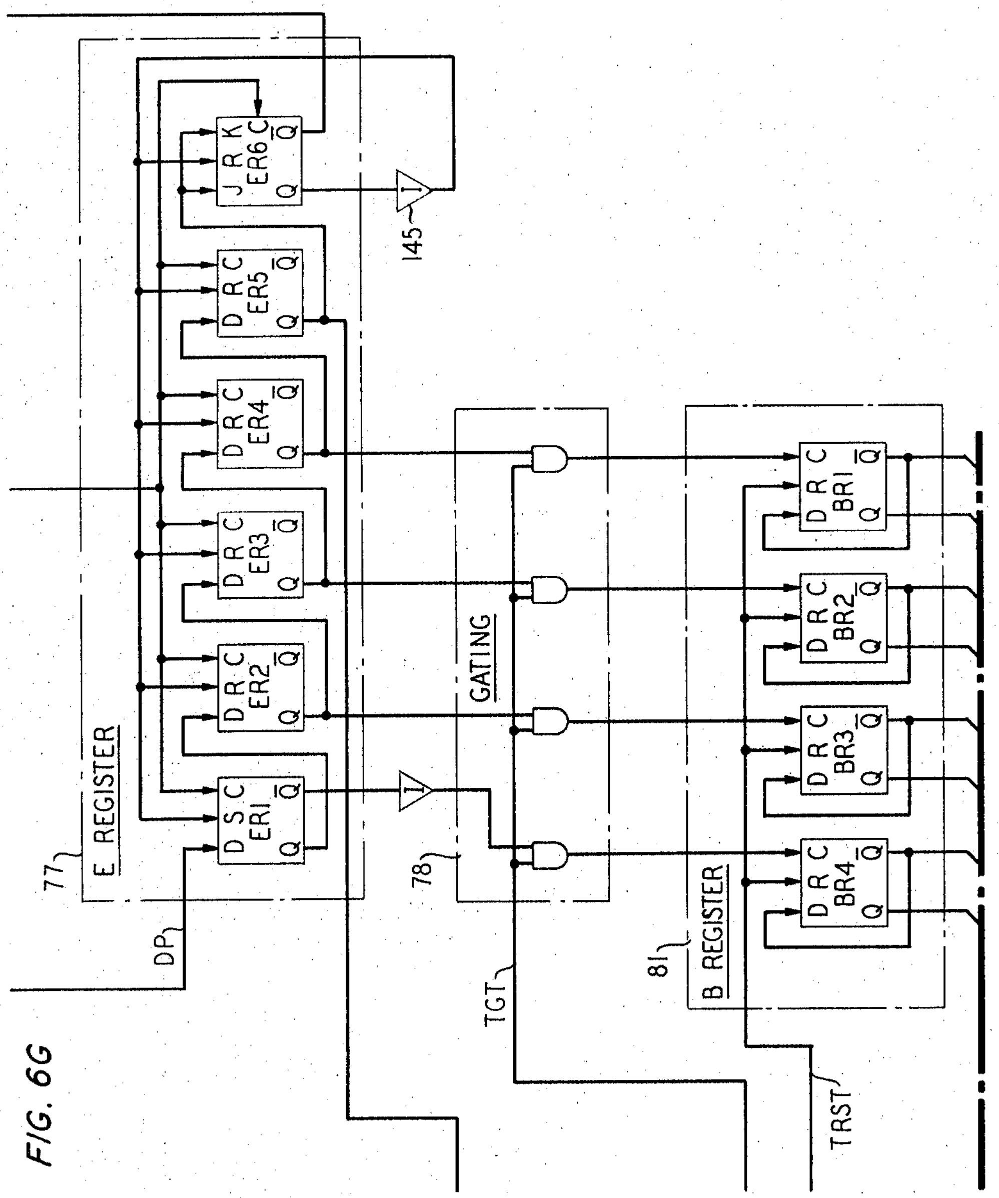
Figure 6H:
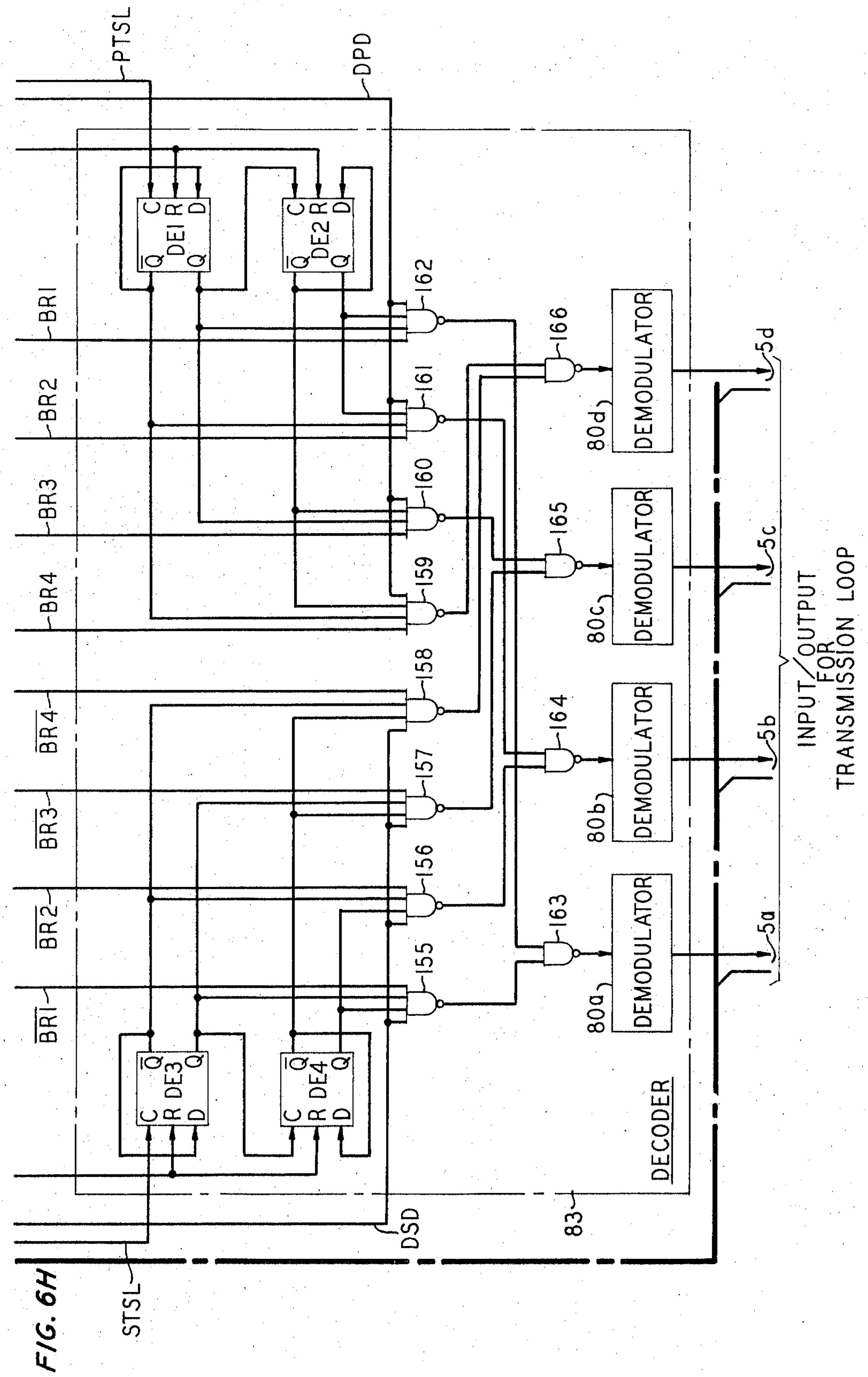

More specifically, the gating of the signals received, on the primary line (FIG. 6A) or on the secondary line, during a time slot to the demodulator associated with that time slot is controlled by the state of a flip-flop corresponding to that demodulator in the B register (FIG. 6G). The state of each flip-flop comprising the B register is set, in a manner discussed subsequently, by the presence of a pulse in the respective time slot of the test transmission received on the primary line (FIG. 6A). For example, if the transmission terminals 2*c* (FIG. 1) and 2*d* place pulses in their respective time slots in the test transmission, the flip-flops BR3 (FIG. 6G) and BR4 in the B register 81 assume the set state. The Q outputs of the flip-flops in the B register 81 are applied to the NAND gates 159 through 162 (FIG. 6H), respectively, which control the gating of signals received on the primary line (FIG. 6A) to the aforementioned NAND gates 163 and 166. The $\overline{Q}$ outputs of the flip-flops in the B register 81 (FIG. 6G) are applied to the NAND gates 155 (FIG. 6H) through 158, respectively, which control the gating of signals received on the secondary line to the aforementioned gates 163 through 166. The other inputs to the NAND gates 155 through 162 serve to properly time the enabling of the respective gates for the appropriate time slots.

With these comments, concerning the control of the selections made by the base terminal (FIG. 6) between signals received on the primary and secondary lines, in mind, the other aspects of signal reception by the base terminal consist substantially of applications of known prior art techniques. The discussion below, therefore, will be limited and, except as otherwise indicated, will be presented only with respect to the processing of signals received on the primary line since the signals received on the secondary line are processed similarly.

The clock 85 (FIG. 6C) generates eight different clock phases. It is necessary to select the clock phase from among these eight which most closely matches the timing of incoming signals received on the primary line (FIG. 6A). To make this selection the signals received on the primary line are applied to the primary phase selector 76 (FIG. 6D). Within the primary phase selector 76, the sync separator 118, which is similar to sync separator 60 (FIG. 4), generates a "1" signal when a synchronization pulse is detected. This "1" signal is inverted and applied as a clocking signal to clock the flip-flop PPS4 to the set state and to clock the flip-flops PS1, PS2, and PS3 to the respective concurrent states of the clock signals CLKD, CLKD1, and PH1. The clock signal CLKD1 is one-half the frequency of the clock signal CLKD and the clock signal PH1 is one-half the frequency of clock signal CLKD1. The states of these three flip-flops fully enable one of the gates 134 through 141 to pass one of eight clock phases to the NAND gate 142. As a result, the output of the gate 142 is the selected clock phase signal. This signal is applied to the gate 143 which is enabled by the set flip-flop PPS4 until four clock pulses have appeared at the output of the gate 143. At that point flip-flop PPS4 is reset by the $\overline{\text{ER6}}$ signal from the E register 77 (FIG. 6G). It should be noted that the E register operates here merely as a counter by shifting a "1," preset in flip-flop ER1, through the respective stages of the register at the occurrence of each clock pulse from the gate 143 (FIG. 6D).

It should be further noted that while the flip-flop PPS4 is in the set state, the AND gate 154 to which the Q = "1" output of the flip-flop PPS4 is applied is enabled. The other input of the AND gate 154 is driven by the output of the delay circuit 117 to which the data signals received on the primary line are applied. The delay circuit 117 serves to compensate for fixed delays in the clock signal selection circuitry. The data signals thus appearing at the output of the AND gate 154 are applied to the aforementioned NAND gates 159 through 162 (FIG. 6H) to eventually be gated into the demodulators 80.

The flip-flops DE1 and DE2 act as a four-state counter to which the clock signals at the output of NAND gate 143 (FIG. 6D) are applied. The outputs of this four-state counter are selectively connected to the aforementioned NAND gates 159 (FIG. 6H) through 162 to provide the aforementioned timing signals for partially enabling those NAND circuits during the appropriate time slots.

As mentioned above, the same operations are performed with respect to the signals received on the secondary line by the secondary phase selector 84 (FIG. 6B), the A register 86 (FIG. 6E), and the flip-flops DE3 and DE4 (FIG. 6H).

The processing of data signals received on the primary line (FIG. 6) is different from the processing of data signals received on the secondary line in one significant respect, however. Following the initiation of a test transmission by the test control circuit 82 (FIG. 6F), the data signals received on the primary line 3 (FIG. 6A) are applied to the E register 77 (FIG. 6G). Each clock pulse from the gate 143 (FIG. 6D) clocks the signal applied to the D input of the flip-flop ER1 (FIG. 6G) into the flip-flop ER1 and clocks the current Q output of each of the flip-flops in the E register 77 to the next succeeding flip-flop. Thus, after the fourth clock pulse from the gate 143 following the reception of the synchronization pulse for the test transmission, the flip-flops ER1 (FIG. 6G) through ER4 which have assumed the set state indicate those transmission terminals 2 (FIG. 1) which are transmitting customer data signals to the base terminal (FIG. 6) on the primary line. In addition, the "1" which was prestored in the flip-flop ER1 (FIG. 6G) has been shifted to the flip-flop ER5. The Q output of the flip-flop ER5 is applied to the C input of the flip-flop TCC4 in the test control circuit 82 (FIG. 6F). When the "1" appears at the Q output of the flip-flop ER5 (FIG. 6G), the flip-flop TCC4 (FIG. 6F) is clocked to the set state in response to the "1" signal on its D input from the Q output of the previously set flip-flop TCC3. In addition, the Q="1" signal from the flip-flop ER5 (FIG. 6G) in combination with the Q="1" output of the flip-flop TCC4 (FIG. 6F) enables the AND gate 148 to generate a "1" signal which is applied to the gating circuit 78 (FIG. 6G). This "1" signal enables the gating circuit 78 to pass the signals stored in the flip-flops ER1, ER2, ER3, and ER4 to the flip-flops BR4, BR3, BR2, and BR1, respectively, in the previously described B register 81. As a result, the flip-flops in the B register 81 are set corresponding to these signals which, in turn, correspond to signals received in response to the test transmission as above described.

CONCLUSION

The above disclosure has described a transmission arrangement for transmitting time-divided data signals between a base terminal and a plurality of transmission terminals using primary and secondary transmission lines. In this arrangement each transmission terminal contains fault detectors for monitoring the signal reception on the primary line and on the secondary line. In addition, each transmission terminal contains memory devices for selectively storing signals from the fault detectors and control circuitry responsive to the stored fault detector signals and the current fault detector signals for controlling the signals transmitted by the transmission terminal on the primary and the secondary transmission lines. Finally, the base terminal contains fault detectors for monitoring signal reception on the primary and secondary lines together with circuitry for inhibiting the signal transmission from the base terminal on one transmission line if reception is defective on the other transmission line or for inhibiting transmission on both transmission lines.

The cooperative operation of the transmission terminals and the base terminal when a transmission fault occurs effects isolation of the faulty transmission facility and selective interconnection of the primary and secondary transmission lines. As a result, communication with all transmission terminals is maintained or restored notwithstanding the transmission fault. When the faulty transmission facility is repaired, the transmission arrangement is restored to its fault-free configuration by a momentary termination of data transmission from the base terminal.

To ensure the proper processing of received time-divided customer terminal data signals, the base terminal periodically initiates a test transmission consisting of a synchronization pulse. All transmission terminals which receive the transmission and are associated with an active customer terminal insert a pulse in the appropriate time slot. When the test transmission is received on the primary line by the base terminal, the signals in the respective time slots are shifted into the shift register and ultimately stored in a storage register. The stored signals are used to select, for each time slot, between signals received on the primary line and signals received on the secondary line for gating to the appropriate demodulator.

What is claimed is:

1. In a data transmission arrangement comprising a plurality of transmission terminals serially connected in a primary and a secondary transmission line, a transmission terminal for receiving signals from said primary transmission line at a primary receiving port, for transmitting signals to said primary transmission line at a primary transmitting port, for receiving signals from said secondary transmission line at a secondary receiving port and for transmitting signals to said secondary transmission line at a secondary transmitting port, comprising:

a first fault detector connected to said primary receiving port for generating first control signals indicating that a transmission fault has occurred on said primary transmission line;

a second fault detector connected to said secondary receiving port for generating second control signals indicating that a transmission fault has occurred on said secondary transmission line;

a first storage means connected to said first fault detector and said second fault detector for storing said first control signals generated by said first fault detector when said second fault detector subsequently generates said second control signals;

first gating means responsive to output signals from said first storage means for inhibiting the transmission to said secondary transmitting port of signals received at said secondary receiving port when said first storage means stores said first control signals;

a signal processing means comprising an input port and an output port for processing time-divided signals to remove signals appearing in a selected time slot and to insert signals in that time slot;

second gating means responsive to said first control signals for gating signals appearing at said secondary receiving port to said input port of said signal processing means when said first fault detector generates said first control signals indicating a transmission fault has occurred; and third gating means connected to said output port of said signal processing means for gating signals appearing at said output port to said primary transmitting port.

2. The transmission arrangement of claim 1 wherein said transmission terminal further comprises:

a second storage means connected to said first fault detector and to said second fault detector for storing said second control signals generated by said second fault detector when said first fault detector generates first control signals indicating a transmission fault has occurred;

wherein said third gating means is connected to said second storage means for inhibiting the gating of signals from said output port of said signal processing means to said primary transmitting port when said second storage means stores second control signals indicating a transmission fault has occurred; and fourth gating means connected to said output port of said signal processing means and to said second fault detector for gating signals appearing at said output port to said secondary transmitting port.

3. The transmission arrangement of claim 2 wherein said transmission terminal further comprises:

means connected to said first storage means and to said second fault detector for generating first output signals when said first storage means stores first control signals indicating a transmission fault has occurred and said second fault detector generates second control signals indicating a transmission fault has occurred;

means for gating said first output signals to said secondary transmitting port;

means connected to said second storage means and said first fault detector for generating second output signals when said second storage means stores second control signals indicating a transmission fault has occurred and said first fault detector generates first control signals indicating a transmission fault has occurred; and means for gating said second output signals to said primary transmitting port.

4. A data transmission terminal for operation in a loop transmission system comprising first and second transmission lines, the combination comprising:

first and second input ports for connection to first and second input lines respectively;

first and second output ports for connection to first and second output lines respectively;

first and second detector means for monitoring information received on said first and second input ports ane for generating normal and fault output signals indicating the presence and absence of signals at said input ports;

register means responsive to the output signals of said detector means for generating state signals;

switching means responsive to said state signals and said detector means output signals for selectively connecting said first and second input ports to said first and said second output ports; and signalling means responsive to said state signals and said detector output signals for generating and transmitting restart signals on said transmission lines.

5. A data transmission terminal in accordance with claim 4 wherein said register means comprises:

first and second flip-flops respectively associated with said first and second threshold detectors; and means jointly responsive to said detector means fault output signals for setting the one of said flip-flops associated with the first one of said detector means to generate a fault output signal indicating the absence of signals on the associated input port.

6. A data transmission terminal in accordance with claim 5 wherein said signalling means comprises:

means responsive to said state signals and said detector means fault output signals for generating and transmitting restart signals on said first output port when said first input port was the first to exhibit the absence of signals and for generating and transmitting restart signals on said second output port when said second input port was the first to exhibit the absence of signals.

7. A data transmission terminal in accordance with claim 6 wherein each data transmission terminal further comprises:

means responsive to said restart signal for resetting the one of said flip-flops associated with the one of said input ports receiving said restart signals.

8. A data transmission terminal in accordance with claim 4 wherein said signalling means further comprises means responsive to fault output signals generated by the detector means associated with one of said input ports, commencing after the setting of the flip-flop associated with the other of said input port for generating restart signals on both of said output ports.

9. In a data transmission arrangement which comprises first and second transmission lines, a base terminal connected to said transmission lines for transmitting time-divided signals in a first direction on said first line and in a second direction on said second line, a plurality of transmission terminals serially connected in both of said transmission lines and a fault isolation arrangement for isolating transmission line faults by opening the serial connection of said first line and connecting said first line to said second line in the transmission terminal adjacent to the fault on one side and opening the serial connection of said second line and connecting said second line to said first line in a transmission connecting said second line to said first line in a transmission terminal adjacent to said fault on the other side; a reconfiguration arrangement, comprising:

means located in said base terminal for momentarily interrupting the time-divided signals on both of said first and said second transmission lines and wherein said transmission terminals further comprise:

a register circuit for generating state signals indicating that the transmission terminal associated therewith is adjacent to a fault;

a restart arrangement responsive to said state signals and to the interruption of signals on both said first and said second lines for generating and transmitting restart signals on both said first and second lines; and circuit arrangements responsive to said restart signals for disconnecting interconnections between said first and said second lines and for reestablishing the serial connection of said terminals.

10. The data transmission arrangement of claim 9 wherein said fault isolation arrangement comprises:

means, located in said base terminal, responsive to an interruption of signals on either of said first transmission lines for interrupting the transmission on the other of said lines;

determining means in each of said transmission terminals responsive to the interruption of signals on both of said transmission lines for generating output signals indicating, with respect to the associated transmission terminal, which of said lines was the first to exhibit signal interruption;

a first switching arrangement in each of said transmission terminals responsive to said determining means for disconnecting the serial connection of said second line and connecting said second line to said first line when said first line is the first to exhibit signal interruption;

a second switching arrangement in each of said transmission terminals responsive to said determining means for disconnecting the serial connection of said first line and connecting said first line to said second line when said second line was the first to exhibit signal interruption;

means responsive to said determining means for transmitting restart signals on the one of said transmission lines which was the first to exhibit signal interruption;

means in each of said transmission terminals responsive to restart signals received on said transmission lines for maintaining their serial connection in said first and said second line; an means located in said base terminal responsive to said restart signals for reestablishing the transmission of time-divided signals on said first and said second lines.

11. The fault isolation arrangement in accordance with claim 10 wherein said register circuits comprise a first flip-flop associated with said first line and a second flip-flop associated with said second line;

means responsive to said determining means output signals and the interruption of signals on both of said lines for setting the one of said flip-flops associated with the first transmission line to exhibit signal interruption; and means responsive to said restart signals for resetting the flip-flop associated with the transmission line on which said restart signals are received.

* * * * *

UNITED STATES PATENT OFFICE
CERTIFICATE OF CORRECTION

Patent No. 3,859,468 Dated January 7, 1975

Inventor(s) Smith N K-Truesdale J B

It is certified that error appears in the above-identified patent and that said Letters Patent are hereby corrected as shown below:

Column 19, line 53, "ane for generating" should read --and for generating--.

Column 20, line 44, delete "connecting said second line to said first line in a transmission."

Column 20, line 59, "said first and second" should read --said first and said second--.

Signed and sealed this 8th day of April 1975.

(SEAL)
Attest:

RUTH C. MASON
Attesting Officer

C. MARSHALL DANN
Commissioner of Patents and Trademarks

UNITED STATES PATENT AND TRADEMARK OFFICE

CERTIFICATE OF CORRECTION

PATENT NO. : 3,859,468

DATED : January 7, 1975

INVENTOR(S) : Nicholas K. Smith and James B. Truesdale

It is certified that error appears in the above-identified patent and that said Letters Patent are hereby corrected as shown below:

Column 13, line 43, "(FIG. 5)" should read --(FIG. 3)--.
Column 16, line 3, "163 and 166" should read --163 through 166--.

Column 22, line 5, "; an" should read --; and--.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*